UNITED STATES PATENT OFFICE 1,997,304

PROCESS OF MAKING DIARYLAMINE-HALOARSINES

William M. Lofton, Jr., Chicora, and Samuel G. Burroughs, Pittsburgh, Pa., assignors to Pennsylvania Coal Products Company, a corporation of Pennsylvania No Drawing. Application April 30, 1934, Serial No. 723,208

11 Claims. (Cl. 260—14)

The invention relates to a process of making diarylamine-haloarsines, and purifying the same, and more particularly to the making and purifying of diphenylamine-chlorarsine. The invention has for its principal objects, the provision of an improved process whereby a higher content of diarylamine-haloarsine may be secured by the reaction between the oxide of arsenic, such as arsenic trioxide ($As_2O_3$); and the halogen acid salt of a diarylamine, such as diphenylamine-hydrochloride; the provision of a process of the character specified which gives a product of high purity that may be easily processed; and the provision of a process of purifying the reaction product which is cheap, reliable and efficient.

The process is designed particularly for the production of diphenylamine-chlorarsine, and the description of the process following will be directed primarily to the steps involved in producing this product, but it will be understood that the invention is not limited to the production of this particular diarylamine-haloarsine. Heretofore, diphenylamine-chlorarsine has been generally manufactured by one of two methods. It has usually been prepared by a reaction between diphenylamine ($C_6H_5$)$_2NH$ and arsenic trichloride ($AsCl_3$), which was carried out by introducing them together into a reaction kettle and heating to effect the desired reaction. This procedure has been somewhat modified by adding the arsenic chloride (in about 10 per cent excess) gradually to the fused diphenylamine. The second method consisted in heating diphenylamine-hydrochloride and arsenic trioxide together. However, the reaction product of these processes contains certain impurities, and the content of the desired ingredient, namely diphenylamine-chlorarsine, is too low and the processing of the product is difficult.

In carrying out the present process of producing diphenylamine-chlorarsine, arsenic trioxide is well mixed with diphenylamine hydrochloride in the ratio of 2 molecules of the latter to 1 molecule of the former, allowing an excess of about 5 per cent of the arsenic trioxide. The mixture is then charged into a suitable reaction chamber, such as an iron pot equipped so that it may be heated, and also provided with a suitable stirring device, and the mixture is melted and mixed by the stirrer. In this melting operation, the temperature is allowed to rise gradually, and when the temperature reaches 140 to 150 degrees C., the reaction proceeds rapidly. We have found that the content of diphenylamine-chlorarsine in the product is materially increased, if during the reaction, several small portions of an anhydrous acid reacting halide, such as aluminum chloride, are added as a catalyst. For example, in runs which were the same otherwise, the diphenylamine-chlorarsine content of the crude product when anhydrous aluminum chloride was added, was 70 per cent, while without the aluminum chloride, it was only 60 per cent. For this reason, and because subsequent treatment of the product is made much easier, we add to the mixture an amount of anhydrous aluminum chloride which is preferably about one-eleventh of the diphenylamine hydrochloride in the mixture, such addition being made in several small quantities. This addition may be made to advantage in seven equal parts at intervals of 20 to 40 minutes, as the temperature of the mixture rises gradually. We have found that the product has very satisfactory qualities when the time allowed for the entire operation is about 5 hours and when the temperature is allowed to rise over the period of 5 hours to approximately 220 degrees C., this being the preferred procedure.

To further illustrate the procedure in a specific case, we mix together 246 pounds of diphenylamine hydrochloride and 124 pounds of arsenic trioxide, the latter including about 5 per cent excess over the theoretical weight needed. These are then gradually added into the reaction kettle, which is being heated, and in which a mechanical agitator or stirrer is being operated. After all of the mixture has been added to the kettle and melted, 3 pounds and 2 ounces of anhydrous aluminum chloride is added, and this same amount of aluminum chloride is added at intervals of about 25 minutes until seven portions in all have been added, as the temperature of the mixture gradually rises. The final temperature after a period of 5 hours is about 220 degrees C., and the product is now finished and ready to be purified.

While the use of aluminum chloride is preferred, other anhydrous chlorides may be used, such as hydrogen chloride, zinc chloride and ferric chloride or any chemicals liberating HCl under the condition of the reaction.

While the process has its principal use in the manufacture of diphenylamine-chlorarsine, as above described, it may be used in the manufacture of other diarylamine-haloarsines, such as diphenylamine-bromarsine, diphenylamine-iodoarsine, diphenylamine-fluorarsine, ditolylamine-bromarsine, dinaphthylamine-flourarsine, etc. In each case, arsenic trioxide is reacted at melting temperature with the halogen acid salt of the diarylamine, and an anhydrous halide is added to the molten mixture, the procedure paralleling that heretofore described. For instance, in making diphenylamine-bromarsine, arsenic trioxide is mixed with diphenylamine hydrobromide, and melted, and the anhydrous halide, such as aluminum bromide added in the quantity and manner heretofore described. It is preferable to use an anhydrous halide which contains the same halogen as is present in the original diarylamine hydrohalide.

After the product is made, as above described, it is subject to a treatment with hydrochloric acid, in order to extract certain impurities, such as arsenic trioxide, aluminum chloride, and diphenylamine hydrochloride. This may be done by passing hydrochloric acid gas through the molten mass of material, but is best accomplished by allowing the product to run in thin streams, into a dilute acid solution, such as a 5 per cent solution of hydrochloric acid, although dilute solutions of hydrobromic, hydriodic or hydrofluoric acid might be used. The acid should be cool, and the tank is equipped with a stirring device, which preferably fits close against the bottom of the tank. As the molten product pours into the acid solution, it is chilled and sinks, the stirrer exerting a grinding action on the product, breaking it up into fine particles and facilitating the extraction of impurities by the acid solution. The stirring is kept up for some time, after which the stirring is continued while the solution is boiled. The acid solution containing part of the impurities is removed preferably while hot, and the product is subject to one or more further acid washing treatments depending on the degree of purity desired. After the treatment, the diphenylamine-chlorarsine is removed, centrifuged and dried at about 60 degrees C. The product as thus prepared is in good yield, easily prepared for use, and very toxic and aggressive.

The present invention is not limited to the specific details set forth in the foregoing examples, which should be construed as illustrative and not by way of limitation, and it is clearly evident that numerous modifications may be effected therein without departing from the spirit and scope of the invention. For example, the proportion of aluminum chloride may be varied somewhat without seriously impairing the quality of the product, or again the diphenylamine-chlorarsine need not necessarily be in a molten condition when it comes in contact with the acid solution, for it may be first allowed to cool, then broken up by grinding or other means, and then bringing in contact with acid solution and grinding and agitating as described. Or again, it may be allowed to cool, then put into the acid solution, and subjected to the agitating and grinding treatment already described. Also the diphenylamine hydrochloride might be melted, and the arsenic trioxide added thereto, but this is less desirable than the preferred method already outlined. The time allowed for the reaction may be changed somewhat, as may also the temperatures. Other factors will be readily apparent to those skilled in the art.

What we claim is:

1. A process for making diarylamine-haloarsines, which consists in reacting arsenic trioxide and a halogen acid salt of a diarylamine at melting temperatures, adding an inorganic anhydrous acid reacting halide as a catalyst to the mixture and heating until the reaction is complete.

2. A process for making diarylamine-haloarsines, which consists in mixing arsenic trioxide and a halogen acid salt of a diarylamine, melting, adding an inorganic anhydrous acid reacting halide as a catalyst to the mixture and bringing the temperature up to approximately 220 degrees C. to 240 degrees C.

3. A process for making diphenylamine-chloarsine, which consists in reacting arsenic trioxide and diphenylamine hydrochloride at melting temperatures, and adding an inorganic anhydrous acid reacting chloride as a catalyst to the mixture.

4. A process for making diphenylamine-chloarsine, which consists in reacting arsenic trioxide and diphenylamine hydrochloride at melting temperatures, and adding anhydrous aluminum chloride as a catalyst to the mixture.

5. A process for making diphenylamine-chloarsine, which consists in reacting arsenic trioxide and diphenylamine hydrochloride at melting temperatures, adding an inorganic anhydrous acid reacting chloride and further heating until the reaction is complete.

6. A process for making diphenylamine-chloarsine, which consists in reacting arsenic trioxide and diphenylamine hydrochloride at melting temperatures, adding an inorganic anhydrous acid reacting chloride as a catalyst and further heating until the temperature of the mixture reaches approximately 220 degrees C. to 240 degrees C.

7. A process for making diphenylamine-chloarsine, which consists in mixing arsenic trioxide and diphenylamine hydrochloride, melting and agitating, adding an inorganic anhydrous acid reacting chloride in several small portions, and heating further to complete the reaction.

8. A process for making diphenylamine-chloarsine, which consists in mixing arsenic trioxide and diphenylamine hydrochloride, melting and agitating, adding anhydrous aluminum chloride in several small portions and heating further to complete the reaction.

9. A process for making diarylamine-haloarsines, which consists in reacting arsenic trioxide and a hydrohalic acid salt of a diarylamine at melting temperatures, adding an inorganic anhydrous acid reacting halide as a catalyst to the mixture, still further heating the mixture, and then treating the mixture with a hydrohalic acid.

10. A process for making diarylamine-haloarsines, which consists in reacting arsenic trioxide and a hydrohalic acid salt of a diarylamine at melting temperatures, adding an inorganic anhydrous acid reacting halide as a catalyst to the mixture, still further heating the mixture, and then treating the mixture with a hydrohalic acid in the form of a gas.

11. A process for making diarylamine-haloarsines, which consists in reacting arsenic trioxide and a hydrohalic acid salt of a diarylamine at melting temperatures, adding an inorganic anhydrous acid reacting halide as a catalyst to the mixture, still further heating the mixture, and then passing a body of hydrohalic acid gas through the molten mixture.

WILLIAM M. LOFTON, Jr.
SAMUEL G. BURROUGHS.